United States Patent Office 2,868,776
Patented Jan. 13, 1959

2,868,776

CHROMIUM-CONTAINING AZO DYESTUFFS

Hans Ruckstuhl, Basel, Switzerland, assignor to Sandoz A. G., Basel, Switzerland, a Swiss firm No Drawing. Application May 9, 1957
Serial No. 658,017

Claims priority, application Switzerland May 26, 1955

6 Claims. (Cl. 260—147)

The present application is a continuation-in-part of copending application Ser. No. 581,326, filed April 30, 1956 (which has been abandoned since the filing of the present application), and relates to chromium-containing azo dyestuffs which are useful as dyestuffs for wool, silk and synthetic polyamide fibers (e. g. nylon, "Perlon" (registered trademark)), for pigmenting plastics and lacquers, and for dope-dyeing man-made fibers spun from organic solvents (e. g. cellulose acetate, polyacrylonitrile fibers, polyester fibers).

More particularly the inventon relates to a group of chromium-containing azo dyestuffs which before being chromed correspond to the general formula

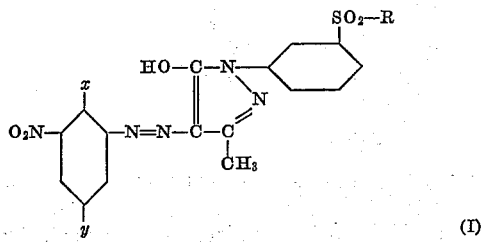

wherein $x$ stands for hydroxy or methoxy, $y$ stands for chlorine or methyl, and R represents the radical of primary butyl or amyl amines containing two hydroxy groups, or of secondary lower alkyl amines carrying one hydroxy group in each alkyl group.

The process for their preparation consists in coupling 1 mol of the diazo compound of an aminobenzene of the general formula

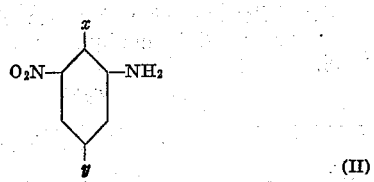

wherein $x$ and $y$ possess the above mentioned significances, with 1 mol of a pyrazolone of the general formula

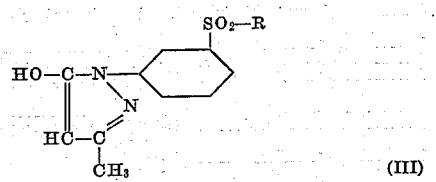

wherein R has the above mentioned significances, and treating the monoazo dyestuffs thus obtained with chromium-yielding agents.

Azo components of particular interest are 1-phenyl-3-methyl-5-pyrazolone-3'-sulfonic acid-(1",1"-dimethylol)-ethylamide, -(1",1"-dimethylol)-propylamide, -di-[(2"-hydroxy)-ethyl]-amide, -di-[(2"-hydroxy)-propyl]-amide and -di-[(3"-hydroxy)-propyl]-amide.

The coupling of the diazo compounds of the 1-hydroxy- or 1-methoxy-2-amino-6-nitrobenzenes of general Formula II with the pyrazolones of general Formula III is carried out advantageously in a weakly alkaline to alkaline medium. The monoazo compounds so formed are separated from the coupling mass by means of salt and then filtered off.

The conversion of the monoazo compounds into their chromium complex compound is conducted advantageously in aqueous solution or in an organic medium, for example formamide, or in the concentrated aqueous solution of an alkaline salt of a low-molecular aliphatic monocarboxylic acid. It is advantageous to employ a quantity of chromium-yielding agent containing less than two but at least one chromium atom to two molecules of the monoazo compound.

Suitable chromium-yielding agents are e. g. chromic fluoride, chromic sulfate, chromic formate, chromic acetate, potassium chromic sulfate or ammonium chromic sulfate. The chromates also, for example sodium or potassium chromate or dichromate, are eminently suitable for metallizing the monoazo compounds. The operation is carried out to advantage in a strongly caustic alkaline medium, to which additions of reducing substances may be made if desired.

The new chromium-containing azo dyestuffs possess outstanding neutral affinity for wool; most of them dye this fiber from neutral dyebaths and silk from weakly acid dyebaths in full bluish red shades of very good fastness to acids, milling, washing and perspiration as well as of an excellent light fastness. In addition they possess excellent migration properties. They are also suitable for dyeing leather and are particularly valuable for the dyeing of man-made nitrogenous fibers such as synthetic polyamide fibers (e. g. nylon, "Perlon" (registered trademark)). Their good solubility in polar solvents such as acetone, dimethylformamide and tetrahydrofuran permits the new dyestuffs to be used for dyeing man-made fibers spun from organic solvents (e. g. cellulose acetate, polyacrylonitrile fibers, polyester fibers) and for pigmenting plastics and lacquers.

The following examples illustrate the invention without limiting its scope. All parts and percentages specified therein are by weight; temperatures are given in degrees centigrade.

EXAMPLE 1

18.9 parts of 1-hydroxy-2-amino-4-chloro-6-nitrobenzene are dissolved in 200 parts of water with 14 parts of a 30% sodium hydroxide solution. 6.9 parts of sodium nitrite are added to the solution, which is then run into 30 parts of hydrochloric acid 30% and ice at 0–5°. The resulting diazo suspension is made weakly alkaline with sodium carbonate and sodium bicarbonate is then added. A sodium hydroxide alkaline solution of 34.1 parts of 1-phenyl-3-methyl-5-pyrazolone-3'-sulfonic acid-di-[(2"-hydroxy)-ethyl]-amide and 200 parts of water is drop-fed slowly into the suspension. The monoazo dyestuff thus formed is completely precipitated; it is filtered off, washed and dried. It is a brown-black powder which dissolves in concentrated sulfuric acid with an orange coloration and in dilute sodium hydroxide solution with a red coloration. It dyes wool by the single-bath chroming process in fast bluish red shades.

The monoazo compound is converted into the chromiferous dyestuff by heating with 25 parts of sodium acetate and 40 parts of ammonium chromic sulfate in 300 parts

3 of formamide for a period of 8 hours at 95°. After being allowed to cool to 20-25°, the reaction mixture is poured into 700 parts of water; the chromium complex compound is separated by the addition of 50 parts of sodium chloride and filtered off. The filter cake is entered into 600 parts of water and 45 parts of a 30% sodium hydroxide solution at room temperature. After brief stirring, 90 parts of sodium chloride are added to the mass; the precipitated chromiferous azo dyestuff is then filtered off and dried. It corresponds, in the metal-free state, to the formula

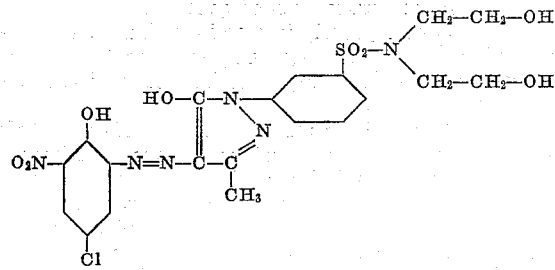

It is soluble in cold acetone, to 100 g. per liter, giving a bluish red solution, and can be used for dyeing cellulose acetate in the dope.

EXAMPLE 2

The diazo suspension obtained by diazotizing 18.9 parts of 1-hydroxy-2-amino-4-chloro-6-nitrobenzene as described in Example 1 is made weakly alkaline with sodium carbonate and sodium bicarbonate is then added. A sodium hydroxide alkaline solution of 36.9 parts of 1-phenyl-3-methyl-5-pyrazolone-3'-sulfonic acid-di-[(2''-hydroxy)-propyl]amide and 200 parts of water is dropped slowly into the suspension. The monoazo dyestuff thus formed is completely precipitated; it is filtered off, washed and dried. It is a brown-black powder which dissolves in concentrated sulfuric acid with an orange coloration and in dilute sodium hydroxide solution with a red coloration. It dyes wool by the single-bath chroming process in fast bluish red shades.

The monoazo compound is converted into the chromiferous dyestuff by heating with 25 parts of sodium acetate and 40 parts of potassium chromic sulfate in 300 parts of formamide for a period of 8 hours at 95°. After being allowed to cool to 20-25°, the reaction mixture is poured into 700 parts of water; the chromium complex compound is separated by the addition of 50 parts of sodium chloride and filtered off. The filter cake is entered into 600 parts of water and 45 parts of a 30% sodium hydroxide solution at room temperature. After brief stirring, 90 parts of sodium chloride are added to the mass; the precipitated chromiferous azo dyestuff is then filtered off and dried. It corresponds, in the metal-free state, to the formula

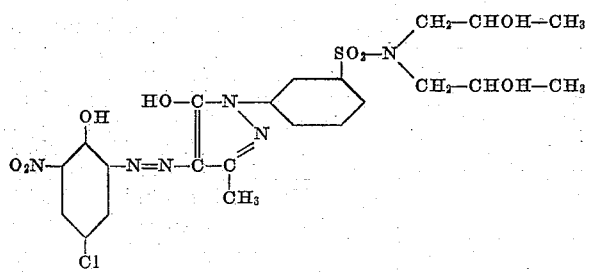

It is a brown-red powder which dissolves in concentrated sulfuric acid with an orange-red coloration and in water with a bluish red coloration. It dyes wool, silk and synthetic polyamide fibers from neutral to weakly acid dyebaths in full bluish red shades of excellent fastness to milling, washing and light. The new dyestuff is also highly soluble in acetone and can be used for dyeing cellulose acetate in the mass.

EXAMPLE 3

16.8 parts of 1-hydroxy-2-amino-4-methyl-6-nitrobenzene are diazotized as described in Example 1. The resulting diazo suspension is made weakly alkaline with sodium carbonate and sodium bicarbonate is then added. A sodium hydroxide alkaline solution of 34.1 parts of 1-phenyl-3-methyl-5-pyrazolone-3'-sulfonic acid-(1'',1''-dimethylol)-ethylamide and 200 parts of water is dropped slowly into the suspension. The monoazo dyestuff thus formed is completely precipitated; it is filtered off, washed and dried. It is a brown-black powder which dissolves in concentrated sulfuric acid with an orange coloration and in dilute sodium hydroxide solution with a red coloration. It dyes wool by the single-bath chroming process in fast bluish red shades.

The monoazo compound is converted into the chromiferous dyestuff by heating with 25 parts of sodium acetate in 300 parts of formamide for a period of 8 hours at 95°. After being allowed to cool to 20-25°, the reaction mixture is poured into 700 parts of water; the chromium complex compound is separated by the addition of 50 parts of sodium chloride and filtered off. The filter cake is entered into 600 parts of water and 45 parts of a 30% sodium hydroxide solution at room temperature. After brief stirring, 90 parts of sodium chloride are added to the mass; the precipitated chromiferous azo dyestuff is then filtered off and dried. It corresponds, in the metal-free state, to the formula

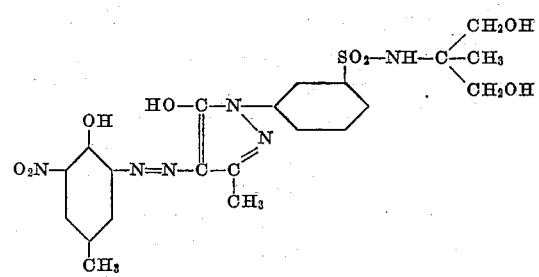

It is a brown-red powder which dissolves in concentrated sulfuric acid with an orange-red coloration and in water with a bluish red coloration. It dyes wool, silk and synthetic polyamide fibers from neutral to weakly acid dyebaths in full bluish red shades of excellent fastness to milling, washing and light. The new dyestuff is also highly soluble in acetone and can be used for dyeing cellulose acetate in the mass.

Further chromium-containing azo dyestuffs can be obtained by treating with a chromium-yielding agent a monoazo dyestuff corresponding to the general Formula I. In the following table they are characterized by the symbols $x$, $y$ and R, and by the shades of the dyeings on wool.

Table

| Ex. No. | x | y | R = Radical of— | Shades of the dyeings of the chromium complex dyestuffs on wool |
|---|---|---|---|---|
| 4 | hydroxy | chlorine | 1,1-dimethylolpropylamine | bluish-red |
| 5 | do | methyl | do | Do. |
| 6 | do | chlorine | 1,1-dimethylolethylamine | Do. |
| 7 | do | do | di-[(3-hydroxy)-propyl]-amine | Do. |
| 8 | do | methyl | do | Do. |
| 9 | do | do | di-[(2-hydroxy)-propyl]-amine | Do. |
| 10 | do | do | di-[(2-hydroxy)-ethyl]-amine | Do. |
| 11 | methoxy | do | do | Do. |
| 12 | do | chlorine | do | Do. |
| 13 | do | do | N-(2-hydroxy)-ethyl-N-(2'-hydroxy)-propylamine | Do. |
| 14 | hydroxy | do | do | Do. |
| 15 | do | methyl | do | Do. |

The following are the formulae of representative dyestuffs, given in non-metallized form, of the foregoing examples.

EXAMPLE 4

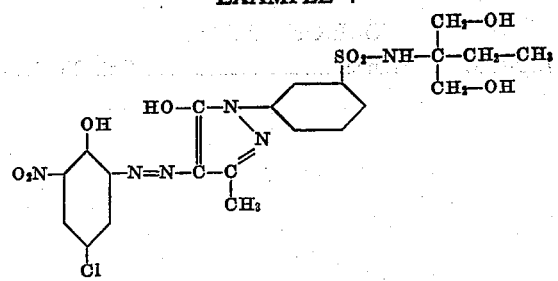

EXAMPLE 6

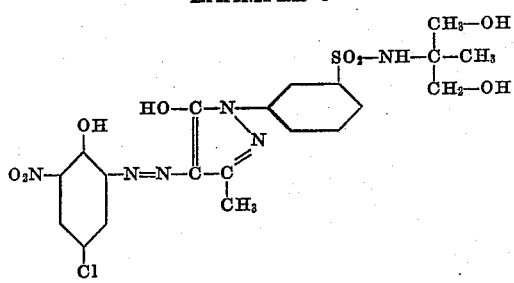

EXAMPLE 7

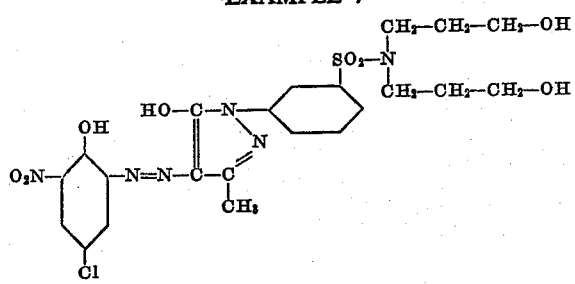

EXAMPLE 16

1 part of anhydrous sodium sulfate and 0.2 part of the chromium-containing azo dyestuff obtainable according to Example 2 are dissolved in 500 parts of water. 10 parts of pre-wetted wool are entered into the dyebath at 30°, and the bath is then heated to 100° in the course of 15 minutes. The temperature is maintained at 100° for 60 minutes. In the course of the dyeing process, 0.2 part of concentrated acetic acid is added, a little at a time. Upon completion of the dyeing, the wool—which is dyed in bluish-red—is removed from the bath, rinsed with water and dried.

Synthetic polyamide fibers are dyed in an identical manner; this is also true of silk, except that in this case a somewhat lower temperature—for example, a temperature of 95°—is employed.

EXAMPLE 17

100 parts of cellulose acetate with a splittable acetic acid content of 54-55% are added to 300 parts of solvent (e. g. a mixture of 275 parts of acetone and 25 parts of methanol). The mass is stirred and allowed to swell overnight.

On the following day 1 part of the chromiferous azo dyestuff obtained according to Example 1 is dissolved in 60 parts of the same solvent. This solution is added to the cellulose acetate solution and the whole stirred until 60 parts of solvent have evaporated.

After the cellulose acetate solution has been filtered through cotton fabric and a cotton-wool filter, the further course of the operation to the formation of the dyed filament is the same as in the production of undyed cellulose acetate.

Having thus disclosed the invention, what is claimed is:

1. Chromium-containing azo dyestuffs which, in their metal-free state, correspond to the general formula

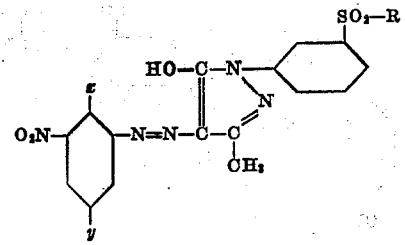

wherein $x$ stands for a member selected from the group consisting of hydroxy and methoxy, $y$ stands for a member selected from the group consisting of chlorine and methyl, and R represents the radical of a member selected from the class consisting of primary butyl and amyl amines containing two hydroxy groups and secondary lower alkyl amines carrying one hydroxy group in each alkyl group.

2. The chromium-containing azo dyestuff which, in the metal-free state, corresponds to the formula

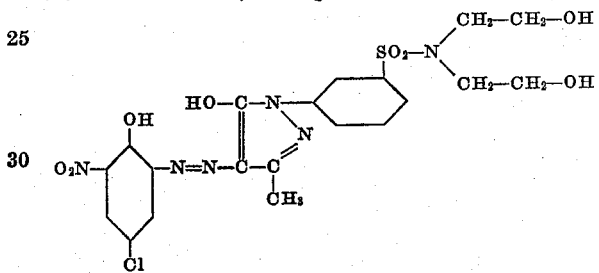

3. The chromium-containing azo dyestuff which, in the metal-free state, corresponds to the formula

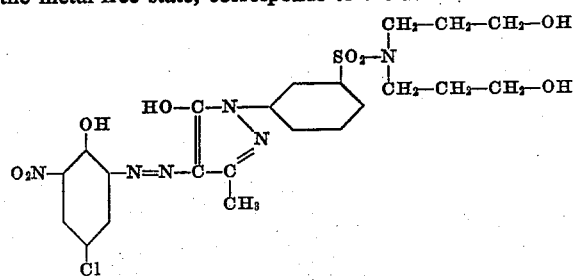

4. The chromium-containing azo dyestuff which, in the metal-free state, corresponds to the formula

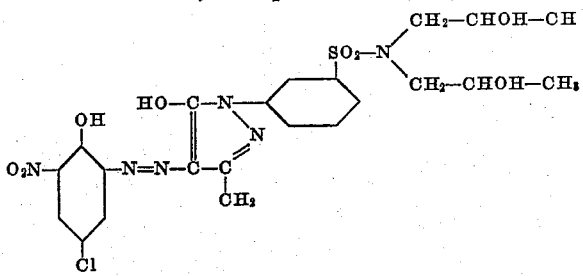

5. The chromium-containing azo dyestuff which, in the metal-free state, corresponds to the formula

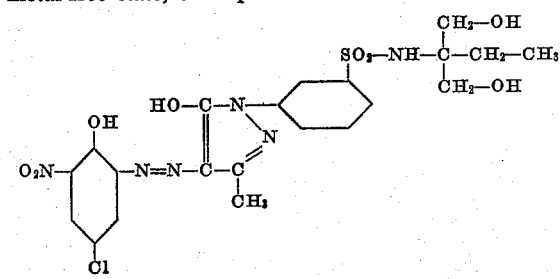

6. The chromium-containing azo dyestuff which, in the metal-free state, corresponds to the formula
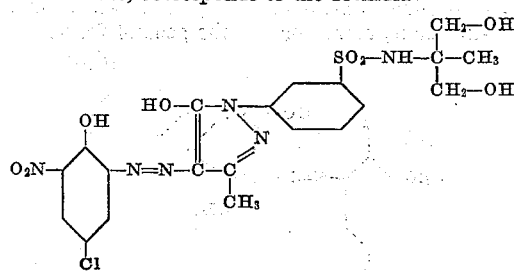
References Cited in the file of this patent
UNITED STATES PATENTS
| | | |
|---|---|---|
| 2,673,201 | Zickendraht et al. | Mar. 23, 1954 |
| 2,817,655 | Schetty et al. | Dec. 24, 1957 |
FOREIGN PATENTS
| | | |
|---|---|---|
| 1,090,537 | France | Oct. 20, 1954 |